Figure 1:
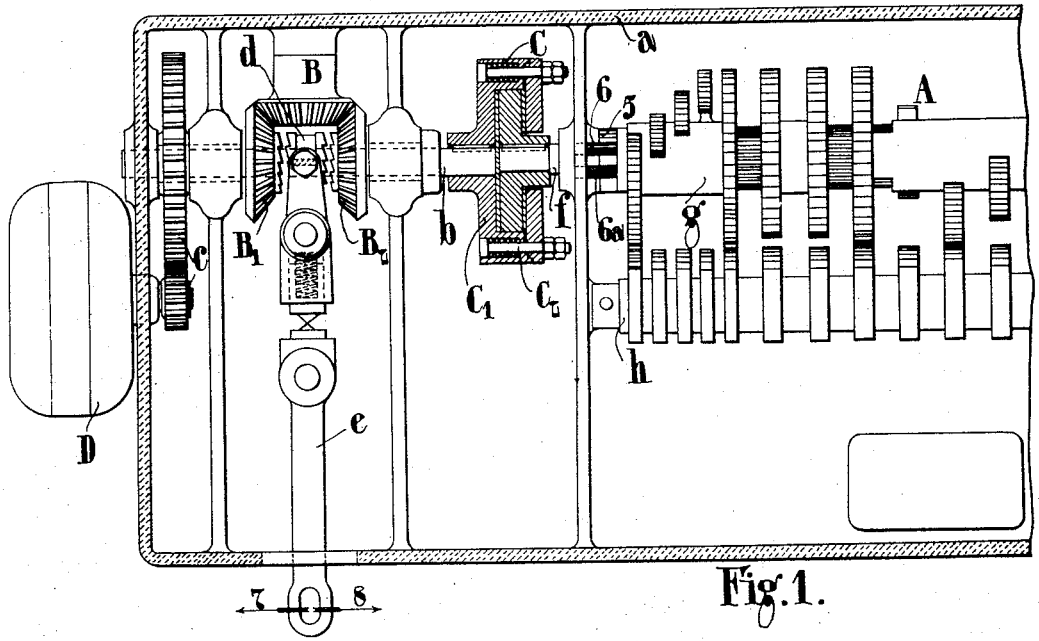
Figure 2:
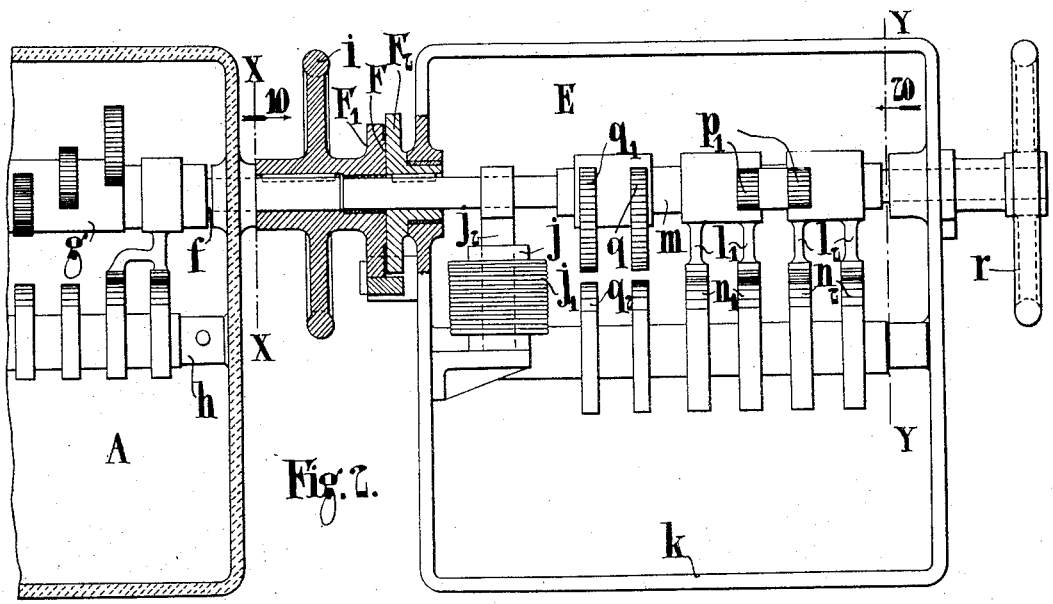
Figure 8:
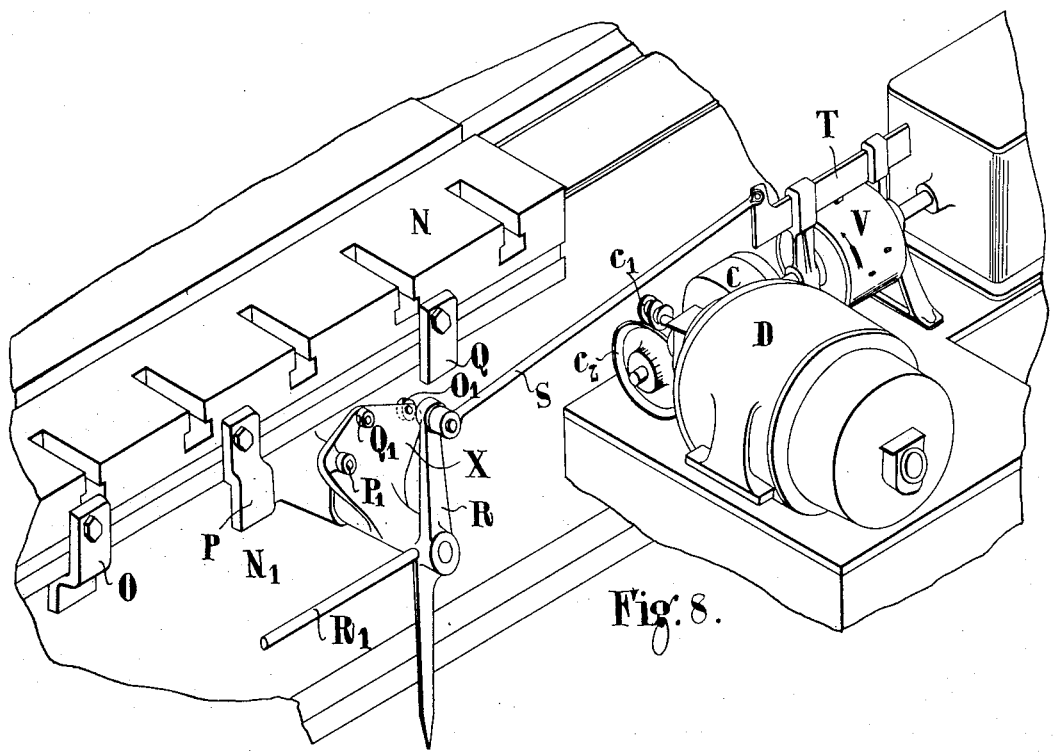
Figure 3:
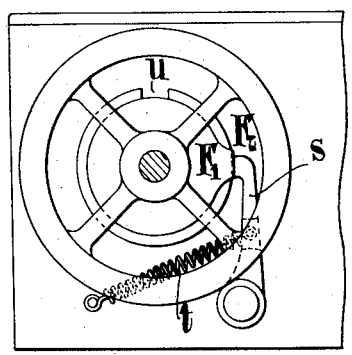
Figure 4:
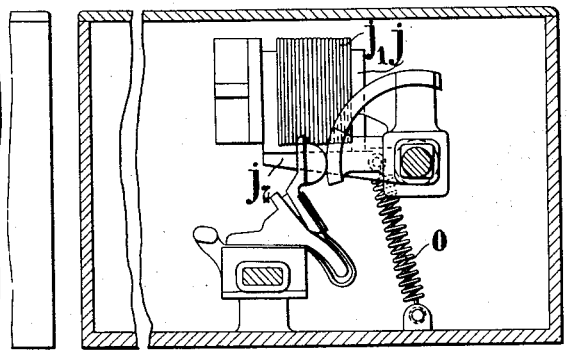

J. P. HALL.
REVERSING AND CONTROLLING GEAR.
APPLICATION FILED MAY 15, 1913.

1,088,657.

Patented Feb. 24, 1914.
6 SHEETS—SHEET 1.

WITNESSES
Charles Thomas
C. A. Krug

INVENTOR:
Joseph Pratt Hall,
BY
ATTORNEYS.

J. P. HALL.
REVERSING AND CONTROLLING GEAR.
APPLICATION FILED MAY 15, 1913.

1,088,657.

Patented Feb. 24, 1914.
6 SHEETS—SHEET 2.

WITNESSES
Charles Thomas.
C. A. Krey

INVENTOR:
Joseph Platt Hall,
BY
ATTORNEYS.

J. P. HALL.
REVERSING AND CONTROLLING GEAR.
APPLICATION FILED MAY 15, 1913.

1,088,657.

Patented Feb. 24, 1914.
6 SHEETS—SHEET 4.

WITNESSES
Charles Thomas.
C. A. Frey

INVENTOR:
Joseph Platt Hall,
BY
ATTORNEYS.

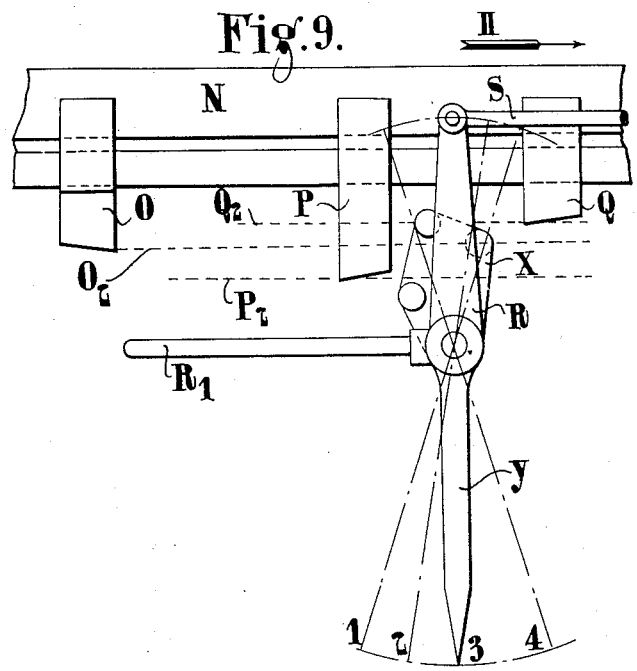
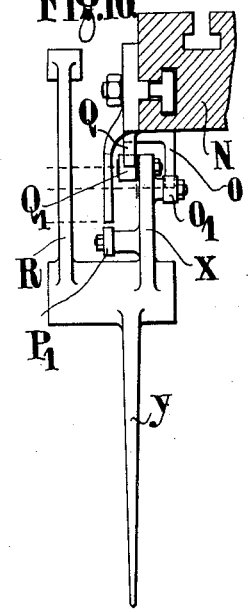
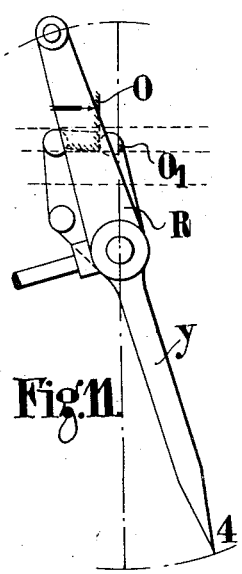
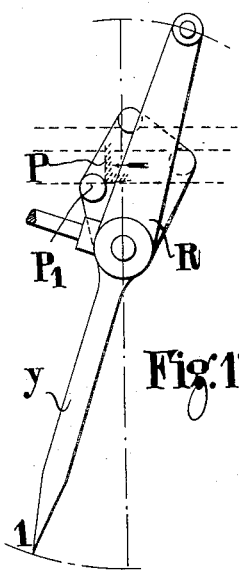
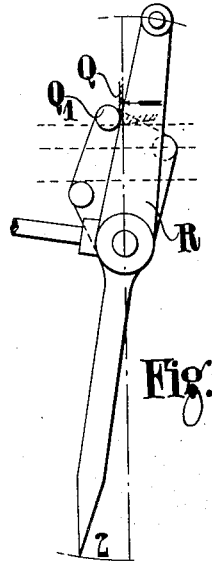

UNITED STATES PATENT OFFICE.

JOSEPH PLATT HALL, OF OLDHAM, ENGLAND.

REVERSING AND CONTROLLING GEAR.

1,088,657.      Specification of Letters Patent.      Patented Feb. 24, 1914.

Application filed May 15, 1913. Serial No. 767,880.

*To all whom it may concern:*

Be it known that I, JOSEPH PLATT HALL, a subject of the King of Great Britain and Ireland, and residing at Blackriding Iron Works, Oldham, in the county of Lancaster, England, have invented a certain new and useful Reversing and Controlling Gear, of which the following is a specification.

This invention relates to an improved gear for automatically reversing and controlling electric motors employed for driving machines and other purposes.

The invention consists in effecting the automatic reversal or control (hereinafter broadly referred to as, control), of the electric motor by means of a controller which is intermittently operated by an independent and continuously running electric or other motor through the intermediary of a slipping or like coupling adapted to slip when the controller is stopped in its various reversing and controlling positions.

According to one form of construction of the gear, the controller is adapted to be alternately turned backward and forward between two stops through the intermediary of a mechanical reversing gear which is interposed between the independent motor and the slipping coupling and the reversal of which is effected by the part of the machine to be reversed.

According to another form of construction the controller is adapted to be intermittently driven in one and the same direction by the independent motor through the intermediary of the slipping coupling and be stopped in the various reversing and controlling positions by means of a device hereinafter referred to as the "selecting" gear which is controlled by the part of the machine to be driven.

The invention also consists in the use in conjunction with the reversing and controlling gear hereinbefore referred to of a main switch connected with the controller through the intermediary of an interlocking device, the arrangement being such that the main switch can be closed for starting purposes only when the controller is in its "off" position.

Referring to the accompanying drawings: Figures 1 to 5 illustrate by way of example the first form of construction of the gear, Figs. 1 and 2 being part sectional plan views of the gear, Fig. 3 a cross section taken along the line X—X of Fig. 2 and looking in the direction of the arrow 10, Fig. 4 a cross section taken on the line Y—Y and looking in the direction of the arrow 20, and Fig. 5 a diagram of connections. Figs. 6 to 14 illustrate another form of construction, Figs. 6 and 7 being partly sectional plan views of the gear, Fig. 8 a general view thereof, Figs. 9 to 13 various views of a rocking device which is operated by the machine to be driven and coöperates with the selecting gear to stop the controller in its various positions, and Fig. 14 a diagram.

Referring to the form of gear illustrated in Figs. 1 to 5, the controller A which controls the reversing motor, the mechanical reversing gear B and the slipping coupling C interposed between the mechanical reversing gear and the controller, are inclosed in a casing $a$ while the independent motor D which drives the controller through the intermediary of said reversing gear and slipping coupling is arranged outside the same. This motor is preferably a shunt motor and its speed is so chosen as to give smooth working and not to unduly load the main motor during the periods of retardation, reversal and acceleration. The motor D drives the shaft $b$ which is suitably supported within the casing $a$ and carries the reversing gear B and the member C' of the slipping coupling C, through the intermediary of a reduction gear $c$. The shaft $b$ is driven in one direction or the other by the motor D according as to whether the coupling $d$ is coupled to the wheel B' or to the wheel $B^2$ of the reversing gear B, this coupling being operated by the machine to be driven through the intermediary of a lever $e$ which, for instance, in the case of a planing machine is moved alternately in the direction of the arrows 7 and 8 after coming into contact with adjustable tappets suitably arranged on the traveling table of the machine. The second member $C^2$ of the slipping coupling C is fixed on to the spindle $f$ of the controller A and is adapted to be carried around by the coupling member C' and thereby turn the controller when the latter is free to rotate, and to allow said member C' to slip when the controller is stopped in certain positions by suitable stops provided thereon. Thus after the controller has been moved over the full range of contacts in either direction, further movement in that direction is prevented by the stop 5 on the controller spindle coming into contact with one of the stationary stops 6 6ª, and the coupling slips until the direction of rotation is reversed by the lever e operating the reversing gear B. The controller A, which is preferably of the tramway type and comprises suitable contacts mounted on a rotary barrel g fixed to but insulated from the spindle f and adapted to make contact with stationary contacts mounted on but insulated from a fixed support h may be provided with any number of contacts arranged to give shunt and series regulation and rheostatic braking either separately or in combination with one another and with or without an electromagnetic brake as may be desired. The spindle f of the controller is also provided with a hand wheel i so that the controller may be operated by hand when required; for instance, when it is desired to turn it against the action of the slipping coupling or reverse it independently of the mechanical reversing gear, or turn it into the "stopped" position to enable the main switch to be closed and the machine to be started, as hereinafter more particularly referred to.

For the purpose of starting and stopping the main electric motor, which drives the machine, the gear hereinbefore described is provided with a double pole main switch E which is interlocked with the controller by means of an interlocking device F in such a manner that it may at any time be opened by hand to stop the motor, or automatically by failure of current, but it can only be moved into its closing position when the controller is in the "off" position. The main switch E is inclosed in a casing k and is inserted in the circuit containing the controller and the main motor which drives the machine. The armature of this motor is indicated by M, the series field coils by H, the interpole coils by K, and the shunt field coils, which may be provided with a discharge resistance, by L. Connected to the controller, which is provided with a blowout coil J, are the series regulating resistance I and the shunt regulating resistance G. The double contacts $l'$ $l'$ and $l^2$ $l^2$ of the switch are mounted on but insulated from a spindle m and are arranged in the positive and negative leads of the circuit respectively. These contacts are kept in electrical connection with corresponding stationary contacts $n'$ $n'$ and $n^2$ $n^2$ by an electro-magnet j provided with a "no-volt" coil $j'$, which may or may not be connected in series with the shunt coils of the main motor and which when energized causes the electro-magnet to keep an armature $j^2$, fixed to the spindle m of the switch, in an attracted position in opposition to the spring o, as shown in the drawing. Any failure of voltage or break in the shunt circuit causes the electro-magnet j to be deënergized, thereby allowing the spring o to move the switch into the "off" position, whereby the main motor is brought to rest, the switch being for this purpose provided with contacts $p'$ $p'$ which when the switch is moved into its "off" position makes contact with certain of the stationary contacts $n'$ and $n^2$ and short-circuit the armature M of the main motor, either through the whole of the resistance I or through part thereof or without such resistance, according to the position of the controller A at the moment when said contact is made. Further, the switch is also provided with movable contacts $q'$ $q'$ and stationary contacts $q^2$ $q^2$ adapted to come into contact with one another when the switch is moved into its "off" position and thereby short-circuit the shunt regulating resistance G so that the shunt field should have its full strength immediately before it is disconnected from the mains.

The interlocking device F is interposed between the spindle f of the controller and the spindle m of the main switch and it comprises a cam $F'$ and a disk $F^2$ keyed to the spindles f and m of the controller and main switch respectively. A pawl s overhangs the cam $F'$ and is pressed against the edge of the disk $F^2$ by means of a spring t, and a notch u cut in the disk $F^2$ is engaged by said pawl when the main switch is in its "off" position. The cam $F'$ is fixed on the controller spindle in such a position that when the controller is in its "off" position the cam $F'$ lifts the pawl s out of the notch u thereby releasing the interlocking device and allowing the main switch E to be operated by the hand wheel r. It will thus be seen that when it is desired to start the main motor M the controller must first be turned around by means of the hand wheel i until the cam $F'$ lifts the pawl s out of the notch u in order to release the main switch, the latter being then moved in the "on" position by means of the hand wheel r.

Figure 5:
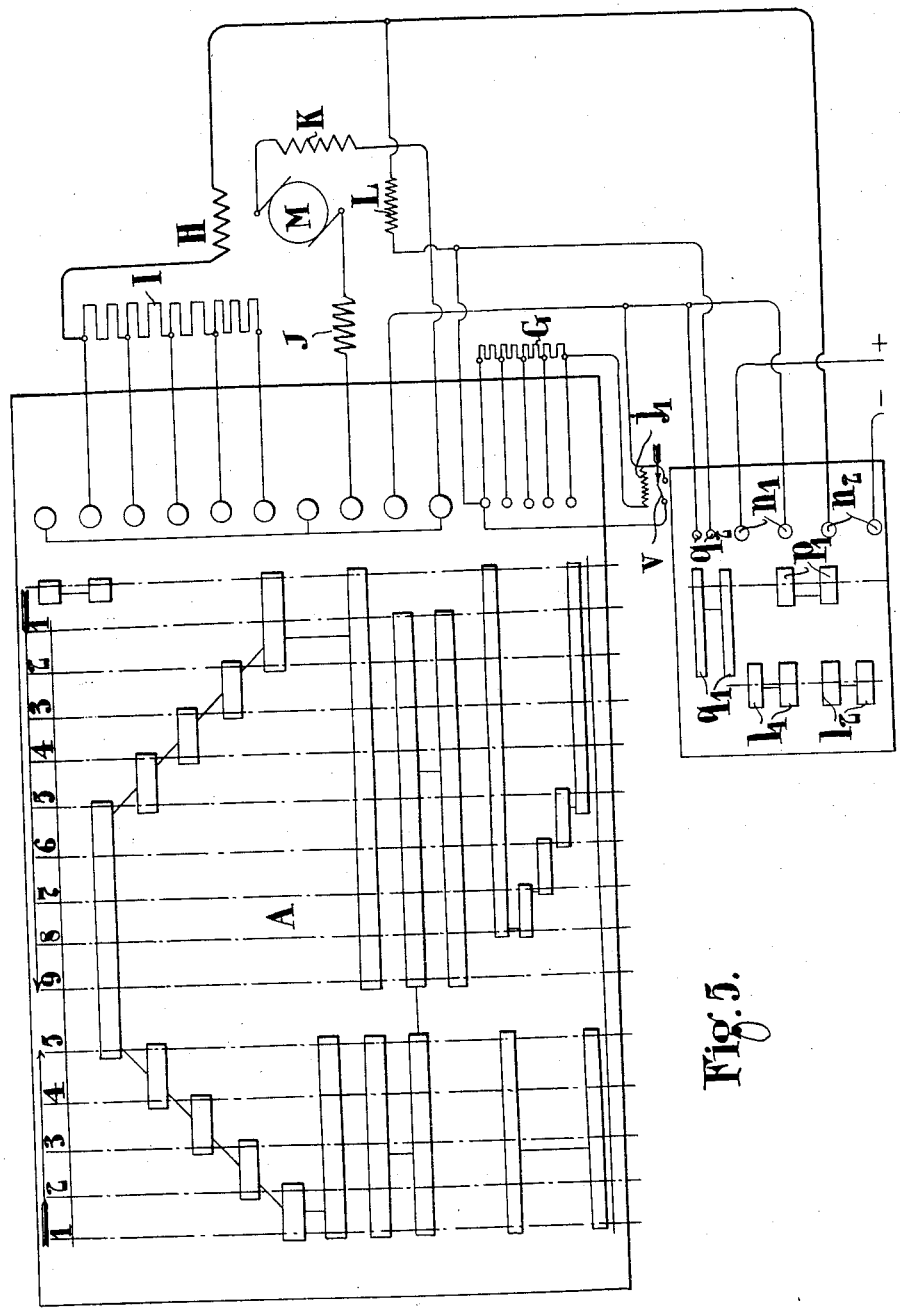
Figure 6:
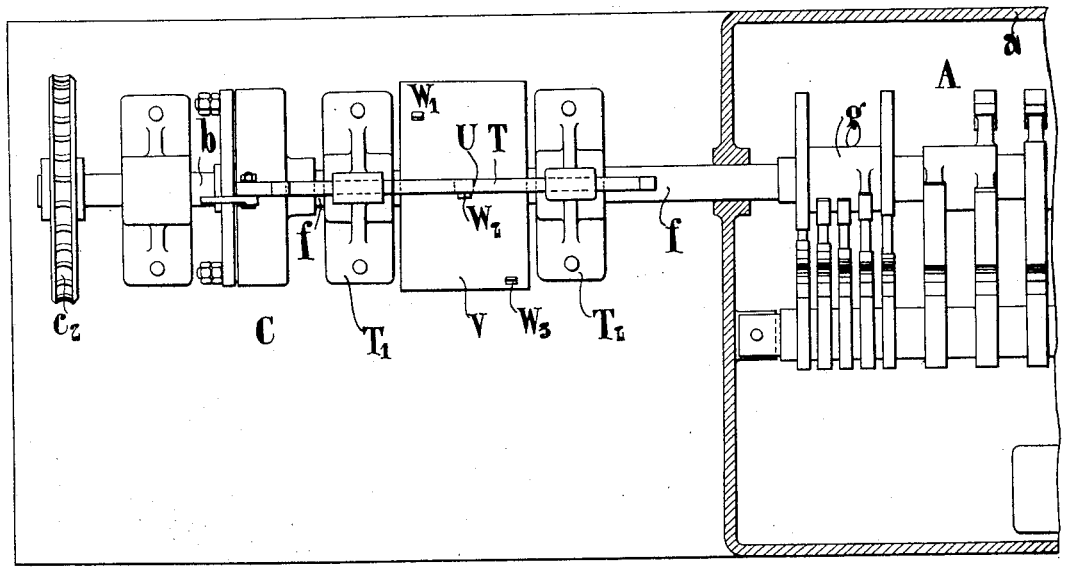
Figure 7:
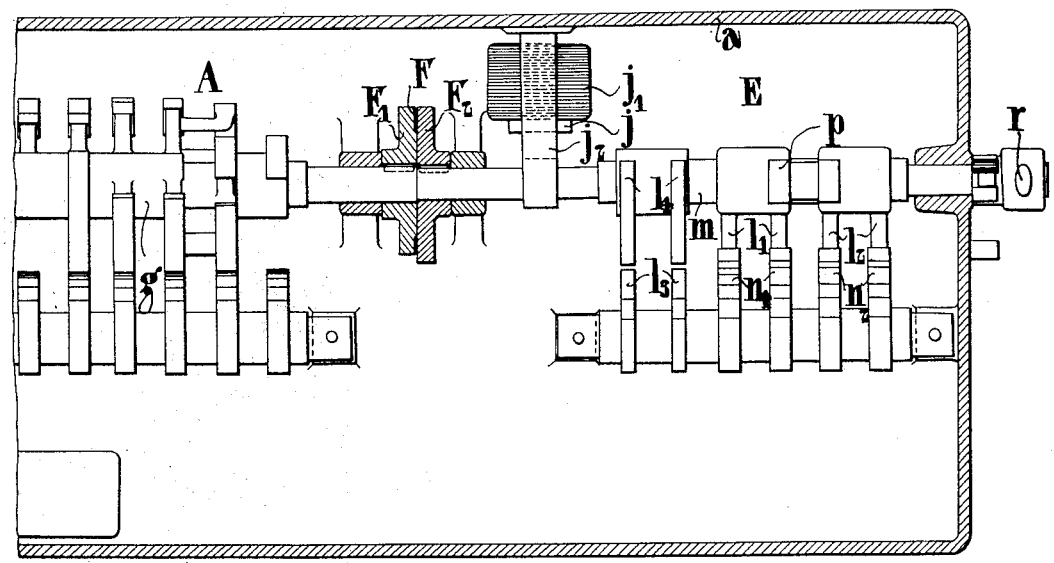

The diagram of connections illustrated in Fig. 5 shows an arrangement of speed regulation by shunt regulation in one direction of rotation only and also an arrangement for rheostatic braking in the "off" position which tends to bring the main motor gradually to rest before reversal. It will, however, be understood that the controller may be fitted with shunt field regulating positions enabling the speed of the motor to be varied in both directions of rotation and that more brake points than shown on the drawing may be provided if desired.

The operation of the automatic reversing gear hereinbefore described is as follows: The small motor D is first started to drive the controller A through the reversing gear B and slipping coupling C. According to the position of the lever e, which position is determined by the machine to be driven, the main motor M will be driven in one or the other direction. As soon as the controller has completed its movement in the direction in which it has been rotated by the mechanical reversing gear, it is brought to rest by one of the stops 6 or 6ª hereinbefore referred to and the coupling C slips until the lever e shifts the coupling d in such a position as to reverse the gear B and thereby alter the direction of rotation of the controller. The reversal of the controller causes the main motor to first slow down, then stop and then reverse, the cycle which took place during the forward movement of the controller being now repeated but in the opposite direction. When it is required to stop the main motor quickly the "no-volt" coil $j'$ is either short-circuited or its circuit is interrupted by means of a small auxiliary switch $v$ or any of a plurality of such switches which may be placed in convenient positions and be so connected that any of them may be used for this purpose. When the "no-volt" coil $j'$ is deënergized by the closing of the auxiliary switch $v$ the armature $j^2$ is released and the spring $o$ automatically opens the main switch E as hereinbefore described.

When the kinetic energy of the moving parts of the machine and of the main motor is great the motor may be provided with an automatic brake in order to assist in bringing them to rest before reversal, the brake being released by means of an electro-magnet, or said kinetic energy may be utilized at either or both reversals to drive the motor as a generator and thereby return energy to the feeding circuit.

Referring to the modification illustrated in Figs. 6 to 14 the parts common to this form of construction and to that illustrated in Figs. 1 to 5 have been denoted by the same reference letters. The controller A, main switch E, the interlocking device F and the electro-magnet $j$ provided with the "no-volt" coil $j'$ are inclosed in a casing $a$ while the reduction gear consisting of a worm and worm wheel $c'$ and $c^2$ respectively and the slipping coupling C together with a "selecting" drum V, which is an important element of this form of construction and the function of which will hereinafter be more fully described, are suitably supported outside the casing $a$. The selecting drum V which is fixed to the spindle $f$ of the controller and is provided with a plurality of stops W' W² W³ W⁴ and W⁵ suitably disposed on the periphery thereof and in definite positions relatively to corresponding contacts on the controller, is driven by the independent motor D through the intermediary of the worm and worm wheel $c'$ $c^2$ and through the slipping coupling C. The construction of this coupling is identical with that of the slipping coupling described with reference to the first form of construction and shown in Fig. 1, one of its members being fixed on to the shaft $b$ which is driven by the independent motor D while the other member thereof is fixed to the spindle $f$ of the controller. A bar T sliding in suitable supports T' T² is provided with a stop U and is reciprocated in front of the periphery of the drum V and transversely thereto for the purpose of coöperating with the latter in such a manner as to stop the controller, which is fixed to the same spindle as the drum V, in certain definite positions when the movable part of the machine to be driven, such as the table N of a planing machine, comes into certain predetermined positions. This is effected by the stop U being brought in the manner hereinafter described in the path of the one or the other of the various stops W' W³ or W⁴ on the selecting drum V and by the latter being rotated by the motor D between the moments that two of the stops thereon which come consecutively into operation, are respectively released and engaged by the stop U, the drum remaining stationary during the engagement of the stop U with the stops W' W³ W⁴ and the coupling C being allowed to slip while said stops are in engagement with one another. The stopping positions of the controller, which moves together with the selecting drum, are indicated by the lines I' I³ and I⁴ which correspond to the positions of the stops W' W³ and W⁴ on the selecting drum. The bar T is operated from the movable table N of the planing machine by means of suitable tappets O, P, Q, provided on the table and coöperating with a rocking member R which is pivoted to the stationary part N' of the machine and is connected with the bar T through the intermediary of a connecting rod S. A support $x$ provided on the rocking member R is adapted to carry a plurality of rollers or the like O' P' and Q' arranged to lie in the planes of the tappets O P and Q respectively, the lower edges of the latter traveling along the lines O² P² and Q² during the forward and backward movement of the table N and the rollers O' P' and Q' being adapted to come into contact with the corresponding tappets O P and Q at predetermined moments during such movement. The rocking member R is also provided with a handle R' for initially setting it in position and with an index $y$ which indicates the position of the stop U relatively to the various stops on the selecting drum V and consequently also relatively to the various positions in which the controller is to be stopped. Thus the positions of the index $y$ indicated in Figs. 9, 11, 12 and 13 by 3, 4, 1 and 2 respectively, correspond to the "brake," "cutting," "full speed reverse " and "reduced speed reverse " positions of the controller.

The improved gear hereinbefore described operates as follows: During the cutting operation the table N of the planing machine is moved by the reversing motor in the direction of the arrow II until the tappet O comes into contact with the roller O', the rocking device R being at this moment in the "cutting" position shown in Fig. 11, while the stop U on the bar T is in contact with the stop W' on the selecting drum V and the controller is stopped in the cutting position I'. During the time the controller is stopped in this position the coupling C slips, but as soon as the bar T has been moved by the rocking member R, which is operated during the further movement of the table N through the intermediary of the tappet O and roller O', in such a position that the stop U becomes disengaged from the stop W' the selecting drum and the controller are again moved forward by the motor D and coupling C. This movement of the controller effects the reversal of the motor which attains its full speed when the controller comes in the position indicated by the line $I^3$, namely, in the "reverse full" speed position. During this movement of the controller resistance is inserted in the shunt circuit of the motor for the purpose of increasing the speed of the latter during the reverse movement of the table as compared with the speed of the motor during the cutting operation of the machine. In the meantime the bar T has been shifted by the rocking device—the position of which at this moment of the cycle of operations is indicated in Fig. 12—in such a position that the stop U is brought in the path of the stop $W^3$ and as soon as the controller comes in the position indicated by the line $I^3$ it is stopped in that position owing to the engagement of the stop U with the stop $W^3$. During the reverse movement of the table N the tappet P comes against the roller P' at a predetermined moment and shifts the rocking device from the position shown in Fig. 12 to that shown in Fig. 13, whereby the stop U on the bar T is brought in the path of the stop $W^4$. When these two stops come into engagement with one another after the controller has again been moved forward and, namely, from the position indicated by the line $I^3$ to that indicated by the line $I^4$, which corresponds to the "reduced reverse" speed, the controller is stopped in this position until the selecting drum is again released owing to the disengagement of the contacts U and $W^4$. This disengagement is effected by the further reverse movement of the table N and by the shifting of the rocking device through the tappet Q and roller Q' which now come into contact with one another and turn the rocking device so as to cause the bar T to be shifted until the stop U comes in the path of the stop W', corresponding to the position of the index $y$ shown in Fig. 11. When the stop U comes into engagement with the stop W' the controller is stopped in the position indicated by the line I', namely, in the "cutting" position. The various movements hereinafter described constitute a complete cycle of operations which operations are then repeated in the same sequence, it being understood that the independent motor driving the controller never stops during the repetition of the cycles and that the coupling C slips whenever and while the controller is stopped in its various positions by the engagement of the stops U on the bar T with the stops on the selecting drum V. The relative speeds of the bar T and selecting drum V must be such that the stop U comes to lie in the path of the stop on the drum next coming into operation before the latter stop reaches the position of the bar. The stop $W^2$ and $W^4$ on the selecting drum V corresponding to the positions "brake after cutting" and "brake after reverse" of the controller, as indicated by the lines $I^2$ and $I^5$ respectively, are provided with the object of stopping the controller in said positions, and they come into engagement with the stop U on the bar T only when the latter stop is brought into their path by moving the rocking member R by hand when it is desired to stop the machine. In order to reverse the table when the same is operated at the "full reverse" speed without shock and excessive strain, the controller is arranged to cut out all the resistance in the shunt field of the motor so as to cause it to act as a generator and return energy to the line, and in so doing to slow down the motor to the normal cutting speed.

Figure 14:
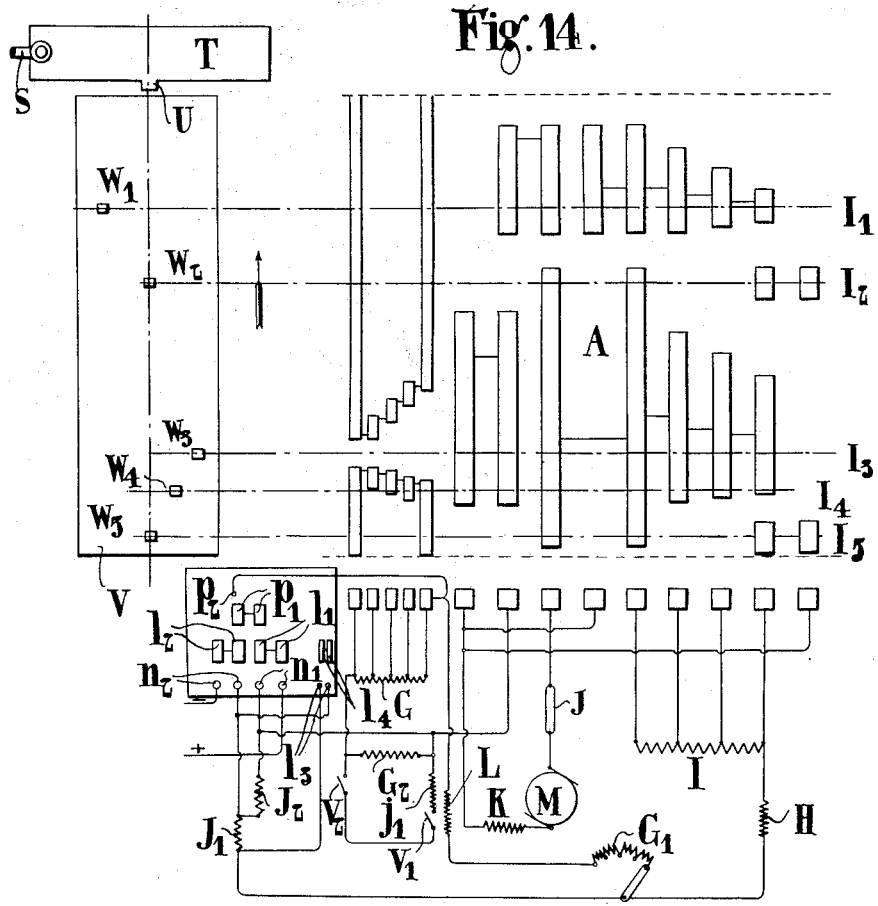

In Fig. 14 G' is a rheostat by means of which the speed of the motor may be independently varied, and $G^2$ a non-variable resistance; J' a braking resistance and $J^2$ a discharge resistance, while $v^2$ is a limit switch. The braking resistance J' is short circuited when the main switch is in the closed position and is introduced into the armature circuit of the main motor when the latter operates as a dynamo, by the contacts $l^3$ and $l^4$ becoming disengaged from one another when the main switch moves into its "off" position. The main switch E is arranged to be operated in the same manner as the main switch described with reference to the first form of construction, being connected with the controller A through the interlocking device F in such a manner that it can be moved into its "on" position for starting purposes only when the controller is in one of its "off" positions. The main switch is held in its "on" position by the electromagnet $j$ which is energized by the "no-volt" coil $j'$, and is automatically moved into its open position when the circuit through the coil $j'$ is interrupted by failure of current or when the tumbler switch $v'$ which is used as an emergency switch, is opened, or when the limit switch $v^2$ which is controlled by the table of the machine to be driven is opened by reason of the table passing beyond a certain predetermined position. The main switch is provided with an additional contact $p^2$ connected to the shunt regulating resistance G, and so arranged that it should be closed and thereby cut out said resistance when the main switch is released the object of this arrangement being to obtain a stronger field when the motor acts as a generator and thus an increased braking effect.

Having now described my invention, what I claim as new and desire to secure by Letters Patent is:—

1. An arrangement for automatically controlling an electric motor in a predetermined cycle comprising in combination a main electric motor, a controller for controlling the main electric motor in a predetermined cycle, a motor separate from the main electric motor for driving the controller, means for stopping the controller in predetermined position and a slipping coupling interposed between the second mentioned motor and the controller, as and for the purpose set forth.

2. An arrangement for automatically controlling an electric motor in a predetermined cycle comprising in combination a main electric motor, a controller for controlling the main electric motor in a predetermined cycle, a motor separate from the main electric motor for driving the controller, a selecting gear for stopping the controller in predetermined positions and slipping coupling interposed between the second mentioned motor and the controller, as and for the purpose set forth.

3. An arrangement for automatically controlling an electric motor in a predetermined cycle comprising in combination a main electric motor, a controller for controlling the main electric motor in a predetermined cycle, a motor separate from the main electric motor for driving the controller, a selecting gear for stopping the controller in predetermined positions consisting of a drum provided with stops and of a reciprocating bar provided with a stop, and slipping coupling interposed between the second mentioned motor and the controller, as and for the purpose set forth.

4. An arrangement for automatically controlling an electric motor in a predetermined cycle comprising in combination a main electric motor, a controller for controlling the main electric motor in a predetermined cycle, a motor separate from the main electric motor for driving the controller, a selecting gear for stopping the controller in predetermined positions consisting of a drum provided with stops, and of a reciprocating bar provided with a stop, means for operating said bar in accordance with the predetermined cycle of operations of the main electric motor and slipping coupling interposed between the second mentioned motor and the controller, as and for the purpose set forth.

In testimony whereof I have signed my name to this specification in the presence of two subscribing witnesses.

JOSEPH PLATT HALL.

Witnesses:
ERNOLD SIMPSON MOSELEY,
MALCOLM SMETHURST.